United States Patent
Je et al.

(10) Patent No.: US 8,339,250 B2
(45) Date of Patent: Dec. 25, 2012

(54) ELECTRONIC DEVICE WITH LOCALIZED HAPTIC RESPONSE

(75) Inventors: Richard Je, Gurnee, IL (US); Itisha Deokar, Palatine, IL (US); Michael Le, Lombard, IL (US)

(73) Assignee: Motorola Mobility LLC, Libertyville, IL (US)

( * ) Notice: Subject to any disclaimer, the term of this patent is extended or adjusted under 35 U.S.C. 154(b) by 593 days.

(21) Appl. No.: 12/249,405

(22) Filed: Oct. 10, 2008

(65) Prior Publication Data

US 2010/0090813 A1  Apr. 15, 2010

(51) Int. Cl.
*G09B 21/00* (2006.01)

(52) U.S. Cl. .............. 340/407.2; 340/407.1; 340/4.12; 341/22; 341/27; 345/173

(58) Field of Classification Search ........... 340/407.1, 340/407.2, 4.12, 825.22; 341/22, 27; 345/156, 345/168, 173, 175; 455/566; 116/200, 205; 200/502, 512
See application file for complete search history.

(56) References Cited

U.S. PATENT DOCUMENTS

| | | | |
|---|---|---|---|
| 6,389,302 B1 | 5/2002 | Vance | |
| 6,710,518 B2 | 3/2004 | Morton et al. | |
| 6,911,901 B2 | 6/2005 | Bown | |
| 7,129,824 B2 | 10/2006 | Cranfill et al. | |
| 2002/0025837 A1* | 2/2002 | Levy | 455/566 |
| 2002/0084721 A1 | 7/2002 | Walczak | |
| 2003/0076298 A1* | 4/2003 | Rosenberg | 345/156 |
| 2003/0174121 A1* | 9/2003 | Poupyrev et al. | 345/156 |
| 2006/0028428 A1 | 2/2006 | Dai et al. | |
| 2006/0050059 A1 | 3/2006 | Satoh et al. | |
| 2006/0052143 A9 | 3/2006 | Tuovinen | |
| 2007/0040815 A1 | 2/2007 | Rosenberg et al. | |
| 2008/0100568 A1 | 5/2008 | Koch et al. | |

OTHER PUBLICATIONS

"Non-Final Office Action", U.S. Appl. No. 12/249,666, filed Oct. 10, 2008, Mailed Dec. 22, 2010.
"Final Office Action", U.S. Appl. No. 12/249,666, filed Oct. 10, 2008, mailed May 24, 2011.
"Notice of Allowance", U.S. Appl. No. 12/249,666, filed Oct. 10, 2008, mailed Jun. 13, 2011.

* cited by examiner

Primary Examiner — George Bugg
Assistant Examiner — Sisay Yacob

(57) ABSTRACT

An electronic device (100) configured to provide a localized haptic response to a user is provided. The electronic device (100) includes an interface assembly (102) having a user interface surface (600) with a display (206) disposed beneath the user interface surface (600). A compliance member, such as a haptic feedback bezel (209) is disposed beneath the display (206). The compliance member includes one or more cantilever members (210) having motion generation devices (402) coupled thereto. Each cantilever member (210) includes an ell (303) that passes about the display (206) and couples to the user interface surface (600). When the motion generation device (402) is actuated, a haptic force is delivered to the user interface surface (600) through the ell (303).

20 Claims, 7 Drawing Sheets

ELECTRONIC DEVICE WITH LOCALIZED HAPTIC RESPONSE

BACKGROUND

1. Technical Field

This invention relates generally to electronic devices having tactile feedback mechanisms, and more particularly to a device having one or more motion generators coupled to a bezel configured to provide a local haptic response to the user interface surface of an electronic device.

2. Background Art

Mobile telephones and other similar portable electronic devices are becoming increasingly popular. As more and more users carry these electronic devices, manufacturers are designing smaller devices with increased functionality. By way of example, not too long ago a mobile telephone was a relatively large device. Its only function was that of making telephone calls. Today, however, mobile telephones fit easily in a shirt pocket and often include numerous "non-phone" features such as cameras, video recorders, games, and music players.

Just as the feature set included in electronic devices has become more sophisticated, so too has the hardware itself. For instance, not too long ago most portable electronic devices included manually operated buttons. These buttons, which were generally limited to the numbers one through nine and zero, as well as a functional button or two, were generally dome-shaped, popple style buttons that a user depressed for actuation. Today, however, manufacturers are building devices with "touch sensitive" screens and user interfaces that include no popple style buttons. They instead include capacitive or other touch sensors that are configured to detect a user's touch. Where the user's touch is detected as corresponding to a user actuation target or other control icon, the device responds just as if a manual button had been pressed by the user.

A problem with these touch sensitive user interfaces is that the user is unable to experience the manual, tactile feedback associated with popple style buttons. Touch sensitive user interfaces are generally no more than a flat surface made of glass or plastic. When the user places his finger above a user actuation target, there is no mechanical response, i.e., no button "pushing back" after being depressed, thereby notifying the user that the button has been pressed.

Designers have grappled with this problem for some time. One prior art solution posed is to provide an audible "click" when a user's touch is detected. However, this solution has problems in that audible sounds are not permissible in some environments, such as libraries and theaters. Further, the user is often unable to hear the audible click in loud or outdoor environments.

A second solution is to provide a vibration device within the electronic device to make the overall device shake when a user's touch is detected. For instance, some manufacturers include a motor that spins an unbalanced weight to make the overall device vibrate. This response is often unwelcome by the user, however, in that it fails to simulate the positive tactile feedback of a single button. Additionally, causing the entire device to vibrate may make actuation of small targets along the user interface difficult due to the motion of the overall device.

There is thus a need for an improved tactile feedback system for an electronic device that provides a more localized haptic experience.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
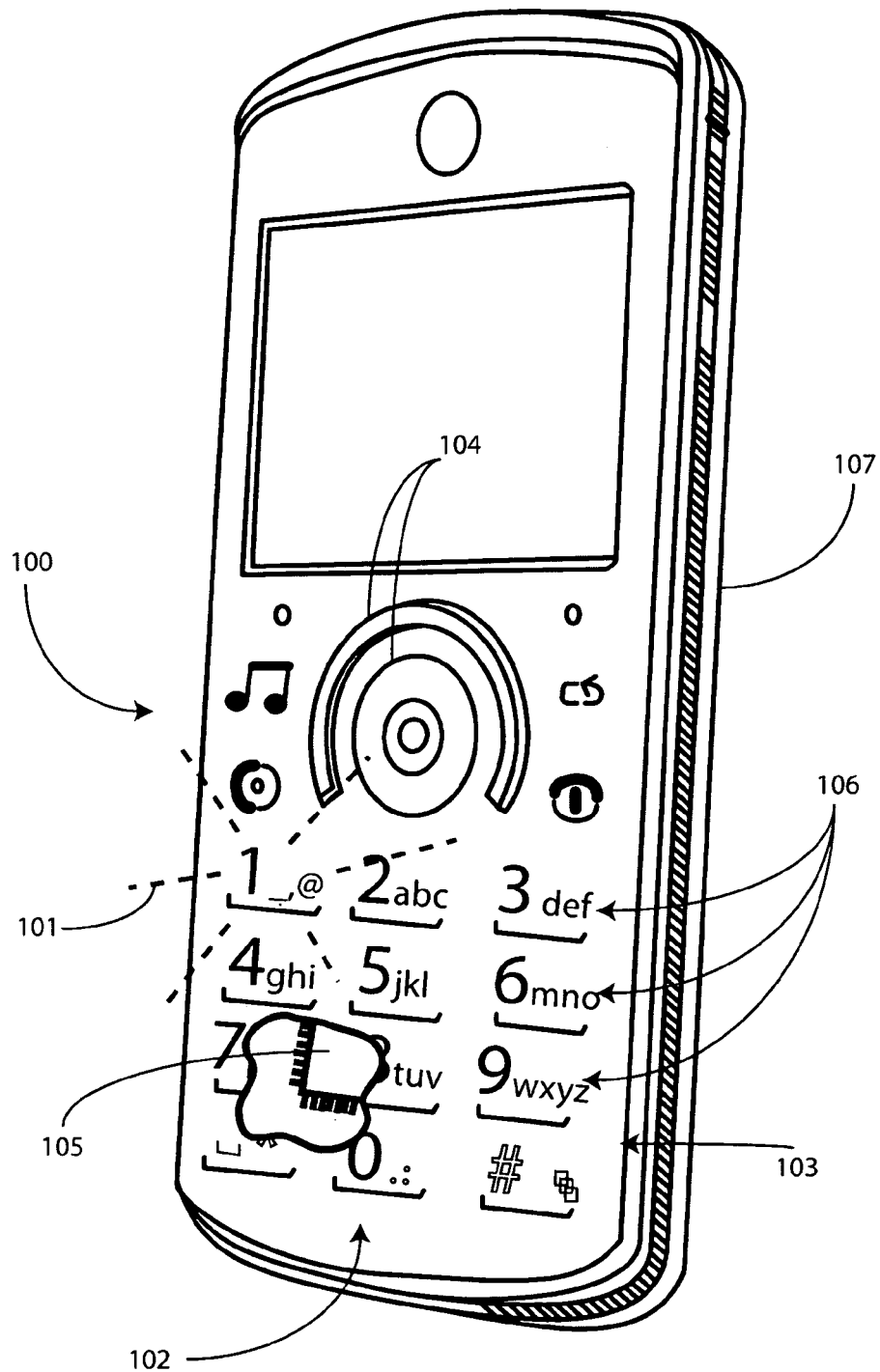
FIG. 1 illustrates an electronic device configured to provide a localized haptic response to a user in accordance with embodiments of the invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to providing a localized haptic response to a user in an electronic device. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

It will be appreciated that embodiments of the invention described herein may be comprised of one or more conventional processors and unique stored program instructions that control the one or more processors to implement, in conjunction with certain non-processor circuits, some, most, or all of the functions of providing drive signals to motion generation devices, or detecting a user's touch through a touch sensing device, for example, as described herein. The non-processor circuits may include, but are not limited to, a radio receiver, a radio transmitter, signal drivers, clock circuits, power source circuits, and user input devices. As such, these functions may be interpreted as steps of a method to perform the operation of providing a localized haptic response. It is expected that one of ordinary skill, notwithstanding possibly significant effort and many design choices motivated by, for example, available time, current technology, and economic considerations, when guided by the concepts and principles disclosed herein will be readily capable of generating such methods and apparatuses with minimal experimentation.

Embodiments of the invention are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the present invention provide a system for providing a localized haptic response to a user. In an electronic device having a user interface surface and a housing, a compliance member is disposed within the housing and has one or more cantilever members extending therefrom that are each coupled to the user interface surface. A motion generation device is coupled to each of the cantilever members, which may be geometrically configured as to correspond to the shape of the motion generation device. When one of the motion generation devices is actuated, it causes the corresponding cantilever arm to deflect. This deflection causes an ell or force providing extension to provide a localized haptic sensation to the user interface surface.

In one embodiment, the compliance member comprises a stamped, spring metal bezel that is placed beneath a user interface surface. The user interface surface is made from glass, reinforced glass, or plastic. The motion generation devices, in one embodiment, each comprise round piezo-electric devices that are coupled to partially circular cantilever arms that extend from the bezel. Each cantilever arm includes an ell that passes about the piezo-electric device and that couples adhesively to the user interface surface. When the user touches the user interface surface, a control circuit coupled to the piezo-electric devices provides a drive signal to one or more of the piezo-electric devices. The drive signal may be a pulse, an impulse, or a brief vibrational wave form. Upon receiving the drive signal, the piezo-electric devices contract, thereby providing a short pulse force to the cantilever arm of the bezel. The ell at the end of the cantilever arm then delivers a force to the user interface surface, is directly mounted to thereto.

In one embodiment, the bezel is coupled to either a housing of the device or to a mechanical support within the device. As the cantilever members deflect relative to the compliance member, the housing remains relatively stable while the user feels a localized, tactical feedback from the user interface surface. In another embodiment, the bezel is not rigidly attached to the surrounding housings. It rather remains somewhat suspended from the user interface surface, as the ells of each cantilever member are coupled to the user interface surface. This suspended configuration permits motion of the bezel in response to piezo-electric device actuation.

While piezo-electric transducers are but one type of motion generation device suitable for use with embodiments of the present invention, piezo-electric material-based transducers are well suited to embodiments of the present invention in that they provide a relatively fast response and a relatively short resonant frequency. Prior art haptic feedback systems have attempted to mount such devices directly to the device housing or the user interface surface. Such configurations are problematic, however, in that piezo-electric materials can tend to be weak or brittle when subjected to impact forces. Consequently, when such a prior art configuration is dropped, these "directly coupled" configurations can tend to break or malfunction. Embodiments of the present invention avoid such maladies in that the piezo-electric devices are suspended within the device on the compliance member or bezel. The piezo-electric devices are able to vibrate while the ell provides a force transfer path to the user interface surface. Experimental testing has shown that devices in accordance with embodiments of the present invention withstand common drop testing experiments. Further, embodiments of the present invention have been shown to provide reliable and consistent localized tactile feedback—as opposed to prior art audio feedback. The design of the compliance member helps to keep this tactile feedback both uniform and localized.

Turning now to FIG. 1, illustrated therein is one embodiment of an electronic device 100 configured to provide a localized haptic feedback response 101 to a user. The electronic device includes an interface assembly 102 having a user interface surface 103. In one embodiment, the user interface surface 103 is a contiguous surface, such as a substantially flat pane of glass, reinforced glass, plastic, or coated plastic. This contiguous surface may be placed atop a singular display that is configured to both present information and user actuation targets to a user. Alternatively, the contiguous surface may be placed atop multiple displays, such as a high-resolution display for presenting information to a user and a low-resolution or charged pigment display configured to present actuation targets to the user. Further, the user interface surface may include dedicated controls such as the illustrative navigation device 104 shown in FIG. 1.

Where a single display is used beneath the user interface surface, suitable displays include liquid crystal displays (LCDs) or other comparable devices that are configured to text and images to a user by altering a large number of pixels which, when viewed collectively by a user, form the presented text or image. Where multiple displays are used, an informational display may include a high resolution display such as an LCD, while user actuation targets are presented by a lower resolution display such as a segmented display.

Regardless of the type of display used, in one embodiment the user interface surface 103 forms the top layer of a touch sensitive interface assembly. Rather than employing buttons, a control circuit 105 is disposed within the device and is capable of executing embedded software commands stored in a corresponding memory to present user actuation targets 106 along the user interface surface. When a user touches any of these user actuation targets 106, the control circuit 105—by way of a capacitive sensor or other touch sensing device—senses the user contact and functions as if a button corresponding to the user actuation target 106 has been pressed.

Advantages of a touch sensitive interface configuration are numerous. One advantage, for instance, is that the user actuation targets 106 can be configured in accordance with the operational modes of the electronic device 100. For instance, in FIG. 1, the electronic device is configured as a mobile telephone. As such, the user interface information of FIG. 1 comprises a plurality of user actuation targets 106 arranged as a twelve-digit key pad and associated controls. Where the electronic device 100 changes operational modes from mobile telephone mode to, for instance, a photo capture mode, the user interface information morphs from the twelve-digit keypad to a photo capture control set.

As noted above, however, one problem with prior art touch sensitive devices is that the user does not receive tactile feedback upon actuating a user actuation target 106. Embodiments of the present invention correct this problem by providing a localized haptic feedback response 101 to a user through methods and apparatuses set forth in the following discussion and figures. This localized haptic feedback response 101 is sensed by the user through the user interface surface 103. This response is felt as a "click" or "pop" while the main housing 107 of the electronic device 100 remains more or less stable.

Figure 2:
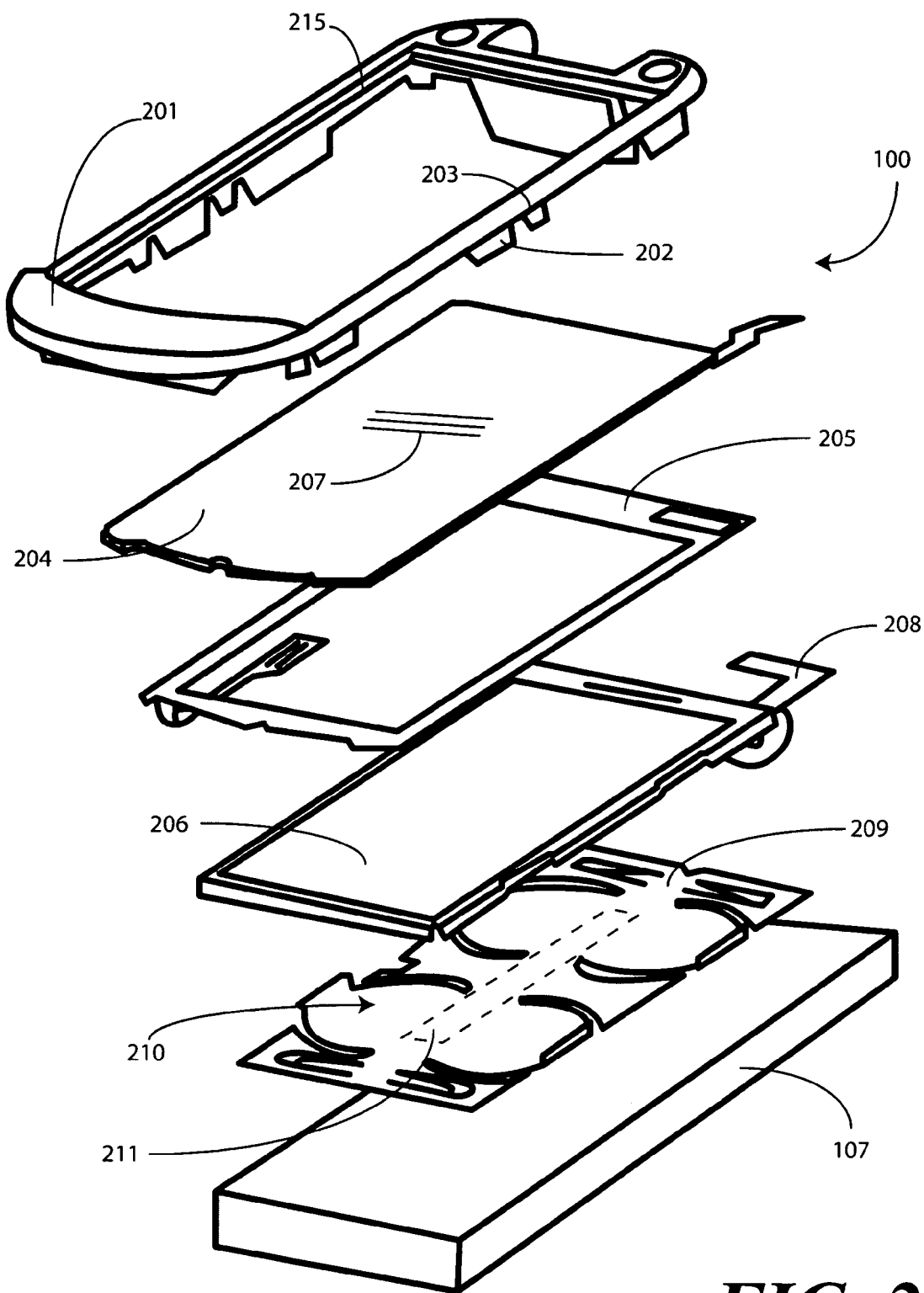
FIG. 2 illustrates an exploded view of various components of an electronic device configured to provide a localized haptic response to a user in accordance with embodiments of the invention.

Turning now to FIG. 2, illustrated therein is an exploded view of the major components of one embodiment of an electronic device 100 configured to provide a localized haptic feedback response (101) to a user in accordance with embodiments of the invention. Starting from the top, the first major component is an upper housing 201. The upper housing 201 interconnects with the main housing 107 to form the outer mechanical structure of the electronic device. The upper housing 201 can be manufactured from plastic, polymers, metal, or other suitable materials. In one embodiment, the upper housing 201 is manufactured from a rigid plastic such as ABS by way of an injection molding process. The upper housing 201 may include latches 203 and connectors 202 suitable for coupling the upper housing 201 with the main housing 107. Similarly, the main housing 107 may be manufactured from metal, plastic, or other rigid materials. The upper housing 201 may be coupled to the main housing 107 in a variety of ways, including latches 203, connectors 202, screws, fasteners, adhesives, or mechanical coupling such as sonic welding.

A display lens 204 fits into a recess 215 of the upper housing 201. As will be shown in later figures, in one embodiment a compliant member, such as a peripheral gasket, is used to seat the display lens 204 within the recess 215. The display lens 204 functions as the user interface surface for the electronic device 100. The display lens 204 can be manufactured from plastic, glass, reinforced glass, or other suitable materials that are both rigid and sufficiently translucent. For instance, in one embodiment the display lens 204 comprises a thin sheet of reinforced glass. A strengthening process may be use to reinforce the glass, such as a chemical or heat treatment process. In addition to serving as the user interface surface, the display lens 204 prevents dust, debris and liquids from invading the device.

In one embodiment, the display lens 204 is configured as substantially transparent. In such an embodiment, all text, graphics, and user actuation targets (106) are presented by a display 206 disposed beneath the display lens 204. In another embodiment, to provide selective ornamentation, text, graphics, and other visual indicators, one may include selective printing on the front or rear face of the display lens 204. Such printing may be desired, for example, around the perimeter of the display lens 204 to cover electrical traces connecting the various layers. Additionally, subtle textural printing or overlay printing may be desirable to provide a translucent matte finish atop the display lens 204. Such a finish is useful to prevent cosmetic blemishing from sharp objects or fingerprints. The display lens 204 may also include an integral ultra-violet barrier. Such a barrier can be useful in improving the visibility of the display 206 and in protecting internal components of the electronic device 100.

Contact with the user interface surface can be detected, in one embodiment, with a capacitive touch sensor. The capacitive touch sensor is operable with the control circuit (105) and works as a general user touch sensor. When a user touches to the user interface surface, the control circuit (105) detects this touch as a change in capacitance in the capacitive touch sensor. The control circuit (105) can then be configured to generate an actuation signal in response so as to deliver the localized haptic feedback response (101) as will be described below.

The capacitive touch sensor can be constructed by depositing small capacitive plate electrodes 207 on the bottom of the display lens 204. In one embodiment the capacitive plate electrodes 207 comprise indium-tin oxide (In$_2$O$_3$-SnO$_2$) layers deposited upon the display lens 204. In such a configuration, the display lens 204 serves as the substrate for the capacitive touch sensor. These capacitive plate electrodes 207 define a particular capacitance. When an object, such as the user's finger becomes proximately located with the user interface surface, a capacitance detection circuit module of the control circuit (105) detects a change in the capacitance of a particular plate combination. The capacitive sensor may be used in a general mode, for instance to detect the general proximate position of an object along the user interface surface. The capacitive sensor may also be used in a specific mode, where a particular capacitor plate pair may be detected to detect the location of an object along length and width of the user interface surface.

In some devices, it is helpful to know not only when a user touches the user interface surface, but also how hard the user interface surface is being pressed. For instance, in some gaming devices, game controls can correspond not only to finger placement along the user interface surface but also with the amount of pressure placed upon the user interface surface by the user. Where contact force is used, a force sensing device such as a force sense resistor layer 205 can be placed beneath the display lens 204.

Force sense resistors are well known in the art. The force sense resistor layer 205, which may be placed about the perimeter of the display lens 204, includes a force switch array configured to detect contact with the user interface surface. An "array" as used herein refers to a set of at least one switch. For instance, where the display lens 204 is manufactured from glass, one switch may be all that is necessary. However, additional precision can be obtained where multiple switches are used in the force sense resistor layer 205. When contact is made with the user interface surface, the control circuit (105) can be configured to detect changes in impedance of any of the switches. The switches of the force sense resistor layer 205 may be any of resistance sensing switches, membrane switches, force-sensing switches such as piezoelectric switches, or other equivalent types of technology.

One or more displays 206 are disposed beneath the display lens 204 and opposite the user interface surface. In one embodiment, a single LCD, such as a reflective or backlit LCD, is used to present graphics, text, and user actuation targets along the user interface surface. The display 206 can include an integral polarization layer. Electronic circuitry, coupled to the display 206 by way of a substrate 208, works in conjunction with the control circuit (105) to drive and power the display.

Beneath the display is a haptic feedback bezel 209. The haptic feedback bezel 209 is a compliance member that is disposed within the main housing 107 of the electronic device 100. The haptic feedback bezel 209 selectively couples to the display lens 204 so as to provide a localized haptic feedback response (101) to the user when the user actuates the user interface surface.

In one embodiment, the haptic feedback bezel 209 includes one or more cantilever members 210 that extend from a central portion 211 of the haptic feedback bezel. One or more motion generation devices, such as coin-type piezo-electric transducers, are then placed on the bottom of each of the cantilever members 210. When the control circuit (105) determines by way of either the capacitive sensor, the force sense resistor layer 205, or a combination thereof, that a user has actuated the user interface, the control circuit (105) delivers a drive signal to one or more of the motion generation devices. This drive signal actuates the corresponding motion generation device, thereby causing the cantilever members 210 to deflect. As each cantilever member 210 is coupled to the display lens 204, a localized haptic force is delivered from the motion generation device to the display lens 204 through the corresponding cantilever member 210.

Figure 3:
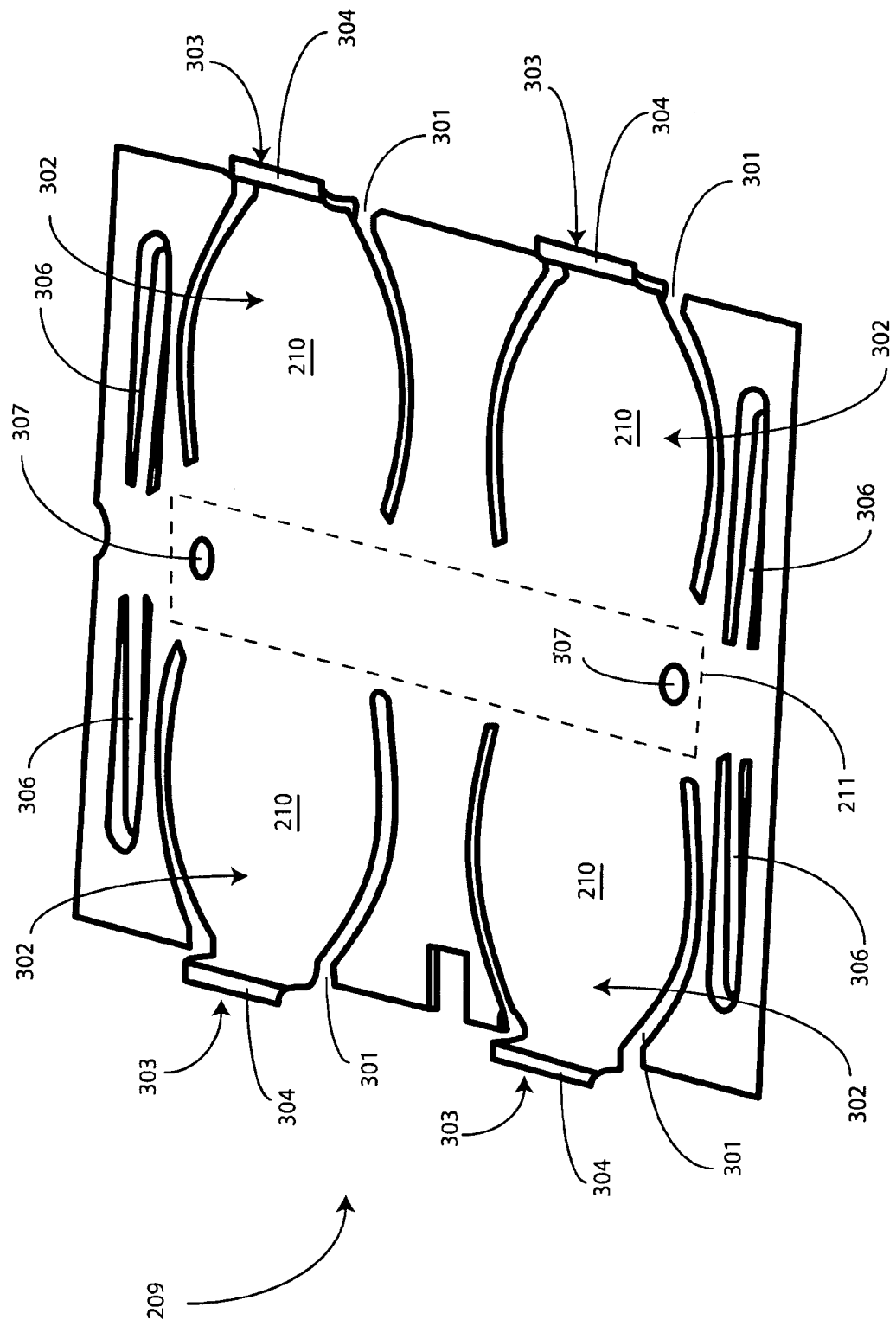
FIG. 3 illustrates one embodiment of a compliance member used in conjunction with one or more motion generation devices to provide a localized haptic response to a user in accordance with embodiments of the invention.

Turning now to FIG. 3, illustrated therein is one exemplary haptic feedback bezel 209 in accordance with embodiments of the invention. The haptic feedback bezel 209 of FIG. 3 is configured as a unitary compliance member manufactured from springy metal such as spring steel. In one embodiment, the compliance member includes a plurality of cantilever members 210 extending distally from a central portion 211 of the compliance member. In the illustrative embodiment of FIG. 3, the cantilever members 210 are formed by cutting partially circular apertures 301 about the cantilever members 210 such that each cantilever member 210 comprises a major face 302 that is at least partially circular. In one embodiment, the apertures 301 extend about the cantilever members 210 between 180 and 315 degrees such that each major face 302 is at least semicircular. This type of arrangement is suitable when circular or substantially round piezo-electric transducers are to be coupled to each cantilever member 210. Where alternate motion generation devices are to be used with the haptic feedback bezel 209, the major faces 302 of the cantilever members 210 may take alternate geometries.

In one embodiment, each cantilever member 210 includes an ell 303 that is configured to engage the display lens (204), and thus the user interface surface. In the illustrative embodiment of FIG. 3, each ell 303 is an extension of spring steel configured in a substantially orthogonal angle with the major face 302 of its corresponding cantilever member 210. Further, each ell 303 includes a user interface surface mounting feature 304 for coupling to the user interface surface of the electronic device (100).

The user interface surface mounting features 304 can be coupled to the display lens (204) or other user interface surface in a variety of ways. For instance, each ell 303 can be coupled to the display lens (204) by adhesively coupling each user interface surface mounting feature 304 to the bottom of the display lens (204). In this configuration, when the control circuit (105) detects, by way of the touch sensor or force sense resistor layer, a force incident upon the user interface surface, the control circuit (105) can deliver a motion actuation signal to the motion generation device coupled to a cantilever member 210. As such, the motion actuation signal—which in one embodiment is an impulse—drives the motion generation device, thereby delivering a localized haptic feedback response (101) is delivered to the user interface surface through the ell 303.

In one embodiment, each ell 303 is adhesively coupled to the display lens (204) with the central portion 211 of the haptic feedback bezel 209 floating within the electronic device (100). In another embodiment, each ell 303 is adhesively coupled to the display lens (204) while the central portion 211 of the haptic feedback bezel 209 is coupled to the main housing (107) of the electronic device (100) or to a mechanical support disposed within the electronic device (100) that is coupled to one of the housings of the electronic device (100). Where the latter configuration is employed, mounting holes 307 may be included along the central portion 211 of the haptic feedback bezel 209. Screws, rivets, plastic stakes, or other fastening devices may couple the haptic feedback bezel 209 to a housing of the device. Alternatively, the mounting holes 307 may be used to couple electronic circuitry needed to drive the motion generation devices to the haptic feedback bezel.

Where the haptic feedback bezel 209 is coupled to a device housing or mechanical support, it can be desirable to provide mechanical isolation between the haptic feedback bezel 209 and the housing or support. Such isolation can enhance the "localized" nature of the haptic response. Where isolation is desired, the haptic feedback bezel 209 can be configured to include one or more isolator arms 306. In the illustrative embodiment of FIG. 3, the isolator arms 306 are configured as preloaded cantilever arms that are bent towards a direction opposite the extension of each ell 303 and away from a plane defined by the central portion 211 of the haptic feedback bezel 209. By configuring the isolator arms 306 in this fashion, the isolator arms 306 will provide a biasing force against the device housing or mechanical support. The isolator arms 306 provide isolation by acting as shock absorbers deflecting toward the plane defined by the central portion 211 of the haptic feedback bezel 209 when any of the motion generation devices coupled to the cantilever members 210 are actuated.

Figure 4:
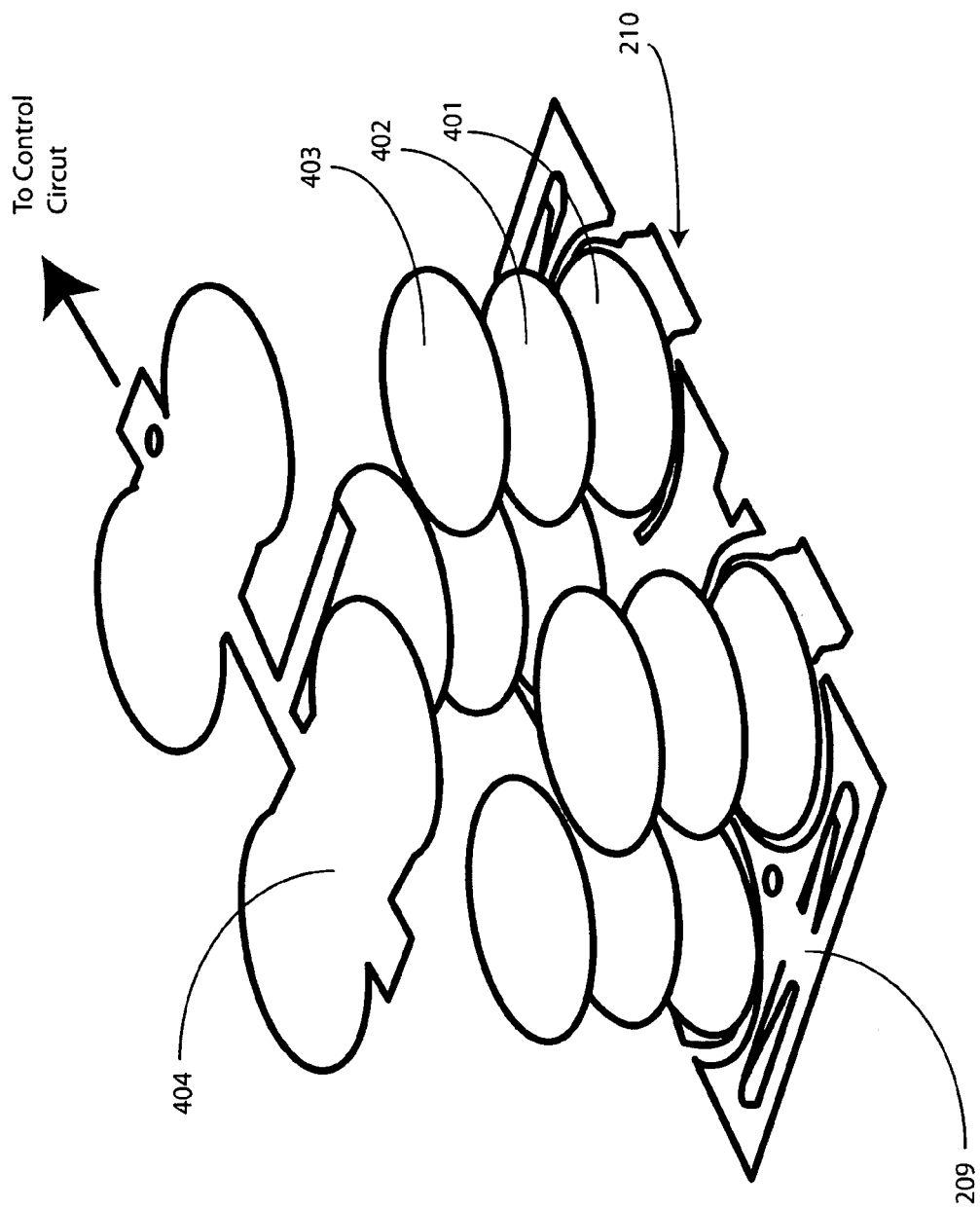
FIG. 4 illustrates one embodiment of a compliance member assembly configured to provide a localized haptic response to a user in accordance with embodiments of the invention.

Turning now to FIG. 4, illustrated therein is an exploded view of the haptic feedback bezel 209, motion generation devices 402, and associated components. In this illustrative embodiment, the motion generation devices 402 comprise round piezo-electric transducers coupled to the cantilever members 210 on a one-to-one basis.

Each motion generation device 40s is coupled to the bottom of a cantilever member 210. Adhesive pads 401 may be used to couple the motion generation device to the cantilever member 210. Conductive adhesive tape 403 is then used to couple a flexible substrate 404 to each motion generation device 402. The flexible substrate 404 delivers signals from the control circuit (105) through the conductive adhesive tape 403 when contact with the user interface surface is detected. For instance, the control circuit (105) can deliver the motion actuation signal to one or more of the motion generation devices 402 thereby causing actuation of the motion generation device 402 and deflection of the cantilever member 210.

Figure 5:
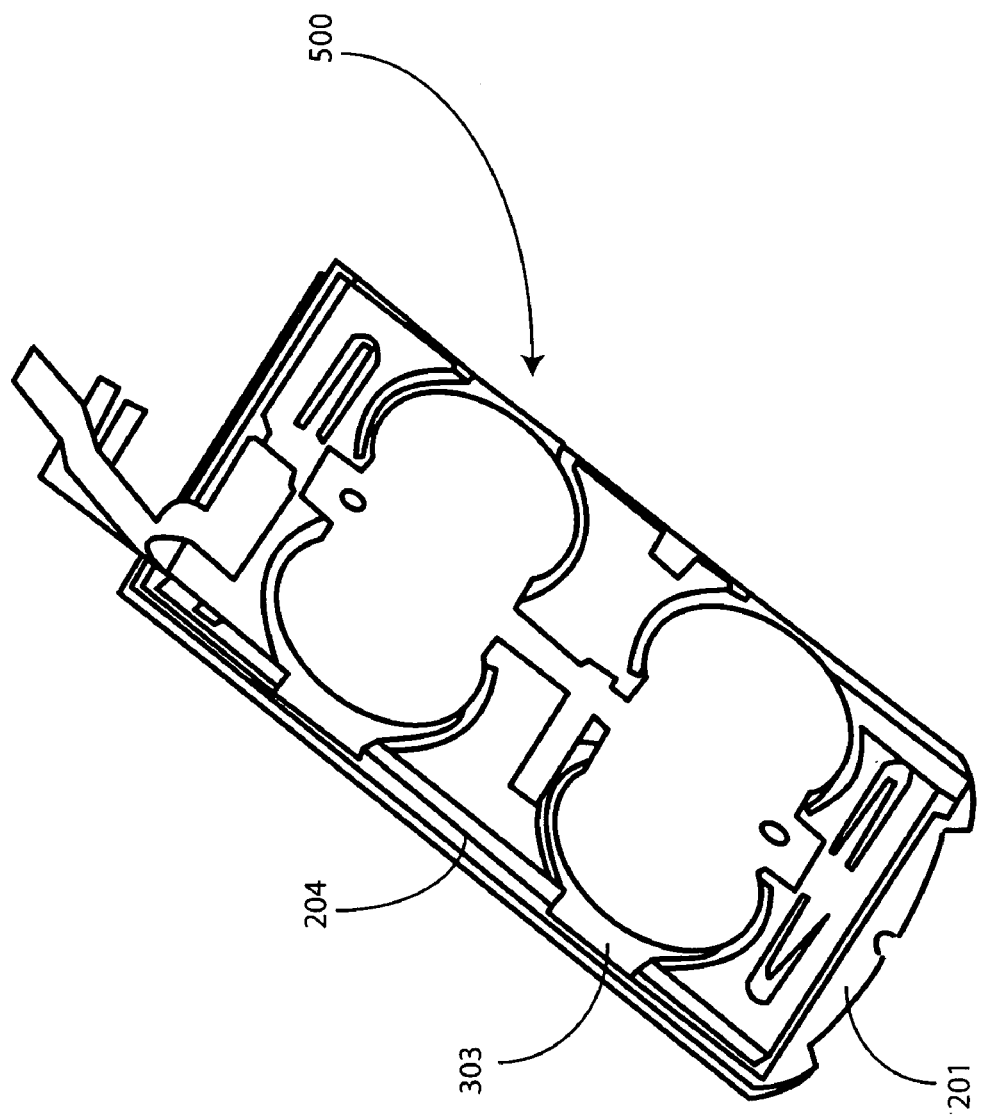
FIG. 5 illustrates a rear, open view of an assembly for use in an electronic device, the assembly being configured to provide a localized haptic response to a user in accordance with embodiments of the invention.

Turning now to FIG. 5, a completed interface assembly 500 can be seen. The display lens 204 has been seated within the upper housing 201. The display 206 has been disposed between the display lens 204 and the haptic feedback bezel 209 such that each ell 303 passes about an outer edge of the display 206. Further, each ell 303 has been adhesively coupled to the display lens 204.

Figure 6:
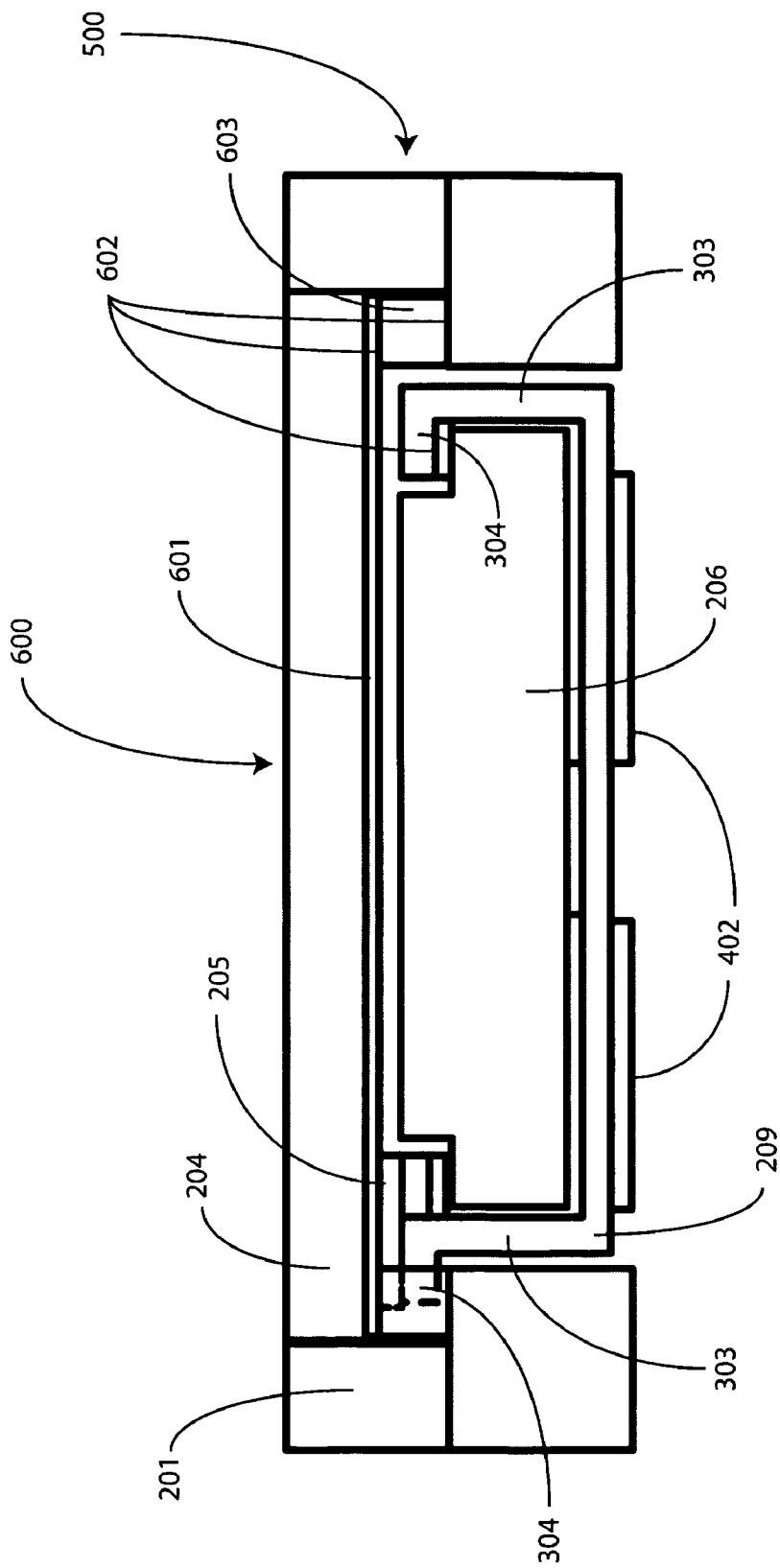
FIG. 6 illustrates a general, sectional side view of one completed interface assembly configured in accordance with one or more embodiments of the invention.

Turning now to FIG. 6, illustrated therein is a general, sectional side view of the completed interface assembly 500. The display lens 204 is seated within the upper housing 201. In the illustrative embodiment of FIG. 6, a pliant member 603, which in one embodiment is a Poron® gasket, is disposed about a perimeter of the display lens. Adhesive is used to couple the display lens 204, pliant member 603, and upper housing 201 together.

The indium-tin-oxide layer 601 of the touch sensor can then be seen. This layer is disposed beneath the display lens 204 and opposite the user interface surface 600. The indium-tin-oxide layer 601 is configured in one embodiment as a plurality of electrode pairs, each defining a capacitance that changes when a user touches the user interface surface 600. The control circuit (105) detects this change and, in one embodiment, is configured to provide a motion actuation signal to a motion generation device 402 upon detecting such a change.

The force sense resistor layer 205, which is optional, is shown in FIG. 6 as also being coupled to the display lens 204. The force sense resistor layer 205 is disposed opposite the user interface surface 600. In one embodiment, the control circuit (105) can be configured to actuate the motion generation devices 402 only when a user's contact force exceeds a predetermined force threshold such as 0.25 lbs. In such a configuration nuisance tripping of the motion generation devices 402 is mitigated.

The display 206 is then disposed beneath the disposed between the display lens 204 and the haptic feedback bezel 209. Each ell 303 passes about the outer edge of the display 206. The user interface surface mounting features 304 then adhesively couple to the display lens 204.

Figure 7:
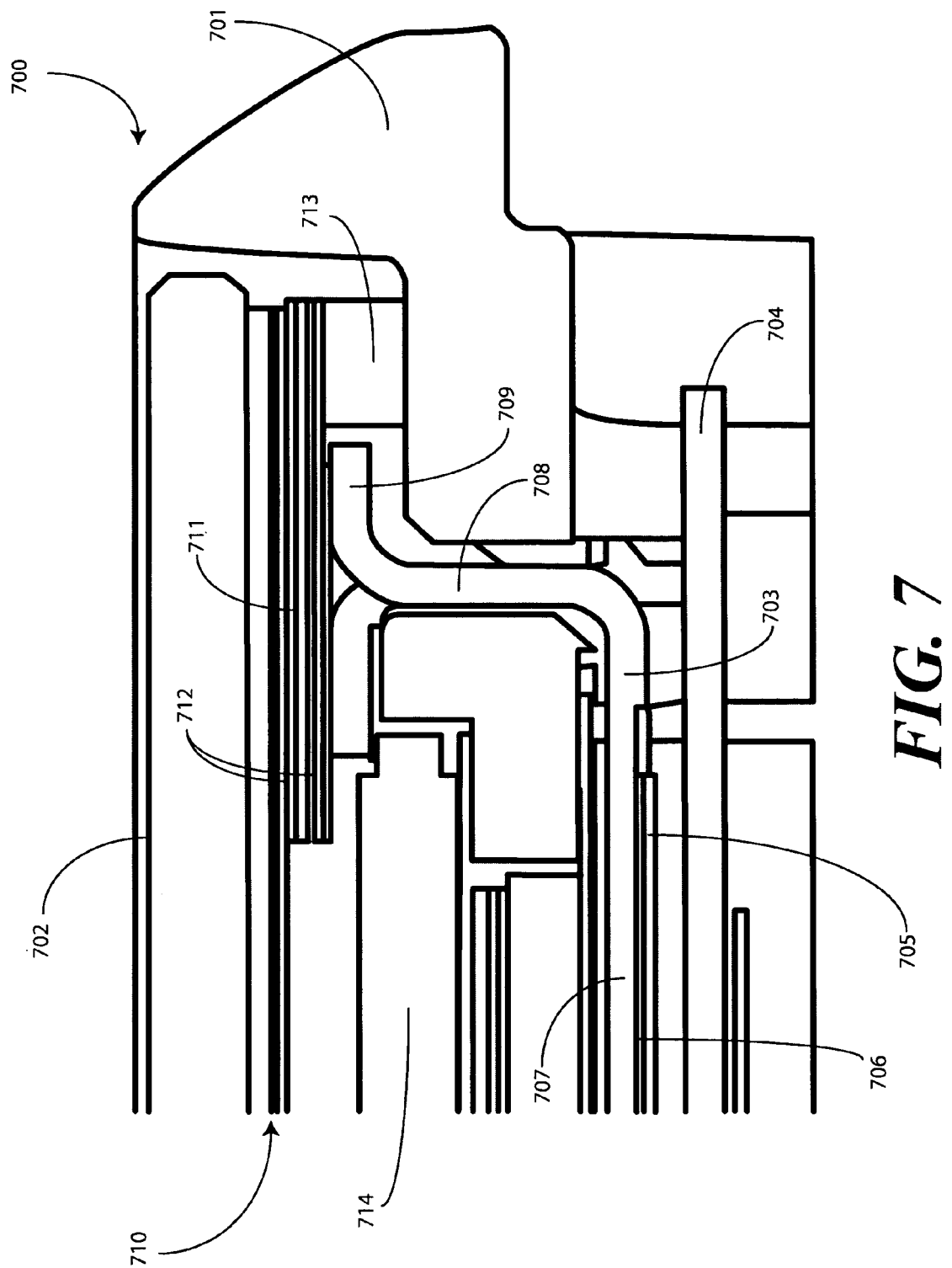
FIG. 7 illustrates an elevational, sectional view of an assembly for use in an electronic device, the assembly being configured to provide a localized haptic response to a user in accordance with embodiments of the invention.

Turning now to FIG. 7, illustrated therein is a sectional view of portable electronic device 700 configured to provide a localized haptic feedback to a user in accordance with embodiments of the invention. The portable electronic device 700 can be any of a mobile telephone, personal digital assistant, gaming device, music device, video device, multimedia device, radio, pager, personal computer, or other similar device.

The portable electronic device 700 of FIG. 7 includes a device body 701, a user interface 702, and a compliance member 703 having a central portion coupled to the device body 701 by way of a metal support 704. In one embodiment, the metal support comprises roughly a 0.30 mm piece of metal. The compliance member 703 of FIG. 7 can be configured like the haptic feedback bezel (209) of FIG. 3, having motion generation devices 705 coupled to flexible arms 707 by adhesive 706. In such a configuration, the metal support holds 704 serves as a mechanical anchor relative to which the flexible arms 707 vibrate when the motion generation devices are active. Each of the flexible arms 707 are configured to provide a haptic impetus to the user interface 702 upon actuation of any of the one or more motion generation devices 705.

Each of the flexible arms 707 extends from a central portion of the compliance member 703 and engages the user interface 702 by way of a force providing extension 708 and a user interface engagement member 709. Each of the flexible arms 707 passes about a display 714, which is disposed beneath the user interface 702. Each of the flexible arms 707, in one embodiment, are configured geometrically to couple to a corresponding shape of motion generation device 705.

A capacitive touch sensor 710 may be disposed along an underside of the user interface 702. A force sense resistor layer 711 may be disposed between the user interface engagement member 709 and the user interface 702, held in place by adhesive tape and one or more spacers 712.

The user interface 702, which in one embodiment comprises a planar or curved piece of reinforced glass, is coupled in one embodiment to the device housing by a pliant member 713. One suitable material for the pliant member 713 is a gasket of 0.50 mm Poron® or SCF 100 material coupled to each of the device body 701 and user interface 702 with adhesive tape. The pliant member 713 allows movement of the user interface 702 relative to the device body 701 through compression and relaxation. This isolated movement of the user interface 702 helps to yield a localized haptic response to the user.

When a control circuit (not shown) detects user contact with the user interface 702, the control circuit delivers a motion actuation signal to the motion generation devices 705. In one embodiment, this motion actuation signal is an impulse or brief oscillating wave. When the motion generation device is actuated, the flexible arm 707 to which it is coupled begins to vibrate. This vibration passes through the spacer 712 of the force sensitive resistor layer 711 to the user interface 702. As such, the user feels the motion of the user interface 702, which is perceived as a localized haptic response.

In the foregoing specification, specific embodiments of the present invention have been described. However, one of ordinary skill in the art appreciates that various modifications and changes can be made without departing from the scope of the present invention as set forth in the claims below. Thus, while preferred embodiments of the invention have been illustrated and described, it is clear that the invention is not so limited. Numerous modifications, changes, variations, substitutions, and equivalents will occur to those skilled in the art without departing from the spirit and scope of the present invention as defined by the following claims. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims.

What is claimed is:

1. A portable electronic device configured to provide a localized haptic feedback to a user, the portable electronic device comprising a device body, a user interface, and a compliance member having a central portion coupled to the device body and having one or more motion generation devices coupled to flexible arms extending from the central portion and engaging the user interface, wherein the flexible arms are configured as cantilever members that deflect relative to the central portion upon actuation of the one or more motion generation devices to provide a haptic impetus to the user interface.

2. The portable electronic device of claim 1, wherein the flexible arms are configured geometrically to couple to a corresponding shape of each of the one or more motion generation devices, wherein each of the flexible arms comprises a force providing extension, coupled to the user interface, and configured to deliver the haptic impetus directly to the user interface upon actuation of a correspondingly coupled motion generation device.

3. An electronic device having a user interface surface and being configured to provide a localized haptic response to a user in response to user contact with the user interface surface, the electronic device comprising:
  a control circuit configured to detect the user contact with the user interface surface;
  a compliance member disposed within the electronic device having one or more cantilever members, each cantilever member being affixed to the user interface surface; and
  one or more motion generation devices coupled to the one or more cantilever members, the one or more motion generation devices being configured to deliver the localized haptic response to the user interface surface through deflection of a corresponding cantilever member in response to actuation of at least one of the one or more motion generation devices upon the control circuit detecting the user contact with the user interface surface.

4. The electronic device of claim 3, wherein the user interface surface comprises a touch sensor operable with the control circuit, wherein the control circuit is configured to, upon detecting the user contact, provide a motion actuation signal to the one or more motion generation devices, thereby causing the one or more cantilever members to deflect.

5. The electronic device of claim 4, wherein the touch sensor comprises a capacitive touch sensor having at least one electrode pair defining a capacitance, wherein the control circuit is configured to detect a change in the capacitance when an object becomes proximately located with the user interface surface.

6. The electronic device of claim 4, further comprising a force sensor layer operable with the control circuit and disposed between the compliance member and the user interface surface, wherein the control circuit is configured to provide the motion actuation signal to the one or more motion generation devices upon determining a force corresponding to the user contact exceeds a predetermined minimum force threshold.

7. The electronic device of claim 6, wherein the motion actuation signal comprises an impulse.

8. An electronic device configured to provide a localized haptic response to a user, the electronic device comprising:
   a device housing;
   an interface assembly having a user interface surface;
   a control circuit configured to detect user contact with the user interface surface;
   a compliance member disposed within the device housing, the compliance member comprising one or more cantilever members extending therefrom, each of the one or more cantilever members comprising an ell configured to engage the user interface surface; and
   one or more motion generation devices coupled to the one or more cantilever members;
   wherein the one or more cantilever members is configured to deflect upon actuation of the one or more motion generation devices by the control circuit, thereby delivering a haptic force from the one or more of motion generation devices to the user interface surface through the ell.

9. The electronic device of claim 8, further comprising a pliant member disposed about the user interface surface and coupling the user interface surface to the device housing.

10. The electronic device of claim 8, wherein the ell is adhesively coupled to the user interface surface.

11. The electronic device of claim 8, wherein the interface assembly comprises at least one display, coupled to the interface assembly opposite the user interface surface.

12. The electronic device of claim 11, wherein the at least one display is disposed between the user interface surface and the compliance member, wherein ells of the one or more cantilever members pass about an outer edge of the at least one display.

13. The electronic device of claim 8, wherein the compliance member comprises a unitary piece of spring metal having a plurality of cantilever members extending distally therefrom.

14. The electronic device of claim 13, wherein each of the plurality of cantilever members comprises a major face that is partially circular.

15. The electronic device of claim 14, wherein the unitary piece of spring metal defines apertures about the plurality of cantilever members that are each at least semicircular.

16. The electronic device of claim 14, wherein the one or more motion generation devices each comprise round piezoelectric transducers.

17. The electronic device of claim 16, wherein the round piezoelectric transducers are coupled to the plurality of cantilever members on a one to one basis.

18. The electronic device of claim 17, further comprising a flexible substrate adhesively coupled to the round piezoelectric transducers and configured to deliver actuation signals from the control circuit thereto.

19. The electronic device of claim 18, wherein the unitary piece of spring metal comprises one or more isolator arms, wherein each of the one or more isolator arms comprises a preloaded cantilever arm biased against the device housing, wherein the preloading of the one or more isolator arms is achieved by providing isolator arms bent towards a direction opposite the ell and away from a plane defined by the unitary piece of spring metal.

20. The electronic device of claim 19, wherein the one or more isolator arms is configured to be deflectable toward the plane of the unitary piece of spring metal upon actuation of the one or more motion generation devices.

* * * * *